(12) United States Patent
DeGanello et al.

(10) Patent No.: US 11,122,840 B2
(45) Date of Patent: Sep. 21, 2021

(54) HEATABLE GARMENT, FABRICS FOR SUCH GARMENTS, AND METHODS OF MANUFACTURE

(71) Applicant: Haydale Graphene Industries PLC, Carmarthenshire (GB)

(72) Inventors: Davide DeGanello, West Glamorgan (GB); Youmna Mouhamad, West Glamorgan (GB); Andrew Claypole, West Glamorgan (GB)

(73) Assignee: Haydale Graphene Industries PLC, Garmarthenshire (GB)

( * ) Notice: Subject to any disclaimer, the term of this patent is extended or adjusted under 35 U.S.C. 154(b) by 196 days.

(21) Appl. No.: 16/071,802

(22) PCT Filed: Jan. 26, 2017

(86) PCT No.: PCT/EP2017/051621
§ 371 (c)(1),
(2) Date: Jul. 20, 2018

(87) PCT Pub. No.: WO2017/129663
PCT Pub. Date: Aug. 3, 2017

(65) Prior Publication Data
US 2019/0029337 A1    Jan. 31, 2019

(30) Foreign Application Priority Data

Jan. 26, 2016 (GB) ..................................... 1601370

(51) Int. Cl.
*A41D 13/005* (2006.01)
*A41D 31/02* (2019.01)
(Continued)

(52) U.S. Cl.
CPC ............ *A41D 13/0051* (2013.01); *A41B 1/08* (2013.01); *A41D 1/06* (2013.01); *A41D 1/089* (2018.01);
(Continued)

(58) Field of Classification Search
CPC .... A41D 13/0051; A41D 31/02; A41D 1/089; A41D 1/06; A41D 2500/50;
(Continued)

(56) References Cited

U.S. PATENT DOCUMENTS 4,885,457 A   12/1989   Au
4,919,744 A   4/1990   Newman
(Continued)

FOREIGN PATENT DOCUMENTS

AU   2015238859 A1   10/2015
CA   2736652 A1   9/2012
(Continued)

OTHER PUBLICATIONS

Park et al., Synthetic Materials, 203, 127-135 (2015).
(Continued)

*Primary Examiner* — Shawntina T Fuqua
(74) *Attorney, Agent, or Firm* — Stites & Harbison PLLC; Richard S. Myers, Jr.

(57) ABSTRACT

The present invention relates to heatable garments (1), comprising a garment body (3) and a heating pad (5) adhered to at least a portion of the garment body (3), wherein the heating pad (5) comprises graphene particles dispersed in a polymer matrix material. The invention also provides fabrics for making such garments, and methods of making such garments and fabrics. Also provided are heatable bedding incorporating a heating pad as described above.

19 Claims, 6 Drawing Sheets

(51) Int. Cl.
*A41D 1/089* (2018.01)
*A41B 1/08* (2006.01)
*A41D 1/06* (2006.01)
*D06N 3/00* (2006.01)
*A01K 13/00* (2006.01)
*A47G 9/02* (2006.01)
*A47G 9/08* (2006.01)

(52) U.S. Cl.
CPC ............ *A41D 31/02* (2013.01); *D06N 3/0063* (2013.01); *A01K 13/008* (2013.01); *A41D 2300/22* (2013.01); *A41D 2400/12* (2013.01); *A41D 2500/50* (2013.01); *A41D 2500/54* (2013.01); *A47G 9/0215* (2013.01); *A47G 9/0238* (2013.01); *A47G 9/08* (2013.01); *D06N 2209/041* (2013.01); *D06N 2211/10* (2013.01)

(58) Field of Classification Search
CPC ............ A41D 2300/22; A41D 2400/12; A41D 2500/54; A41B 1/08; D06N 3/0063; A01K 13/008; A47G 9/0215; A47G 9/0238; A47G 9/08; D06N 2209/041; D06N 2211/10; H05B 3/0085; H05B 3/16; H05B 3/34; H05B 3/342; H05B 3/345; H05B 3/347; H05B 3/36; H05B 2203/002; H05B 2203/003; H05B 2203/004; H05B 2203/005; H05B 2203/007; H05B 2203/01; H05B 2203/013; H05B 2203/015; H05B 2203/017; H05B 2203/036; H05B 2214/04

See application file for complete search history.

(56) References Cited

U.S. PATENT DOCUMENTS

| | | | |
|---|---|---|---|
| 5,010,233 A | 4/1991 | Henschen et al. | |
| 5,068,517 A | 11/1991 | Tsuyuki et al. | |
| 5,742,315 A | 4/1998 | Szlucha et al. | |
| 2003/0102296 A1 | 6/2003 | Nelson et al. | |
| 2006/0011596 A1 | 1/2006 | Sharp et al. | |
| 2008/0197126 A1 | 8/2008 | Bourke et al. | |
| 2010/0096597 A1 | 4/2010 | Prud'Homme et al. | |
| 2013/0180973 A1 | 7/2013 | White | |
| 2013/0321532 A1 | 12/2013 | Gerner et al. | |
| 2015/0184927 A1 | 7/2015 | Fowler | |
| 2015/0241147 A1* | 8/2015 | Brooks | F28F 21/02 165/185 |
| 2015/0272236 A1* | 10/2015 | Chen | H05B 3/342 219/211 |

FOREIGN PATENT DOCUMENTS

| | | |
|---|---|---|
| CN | 101558455 A | 10/2009 |
| CN | 102300346 A | 12/2011 |
| CN | 103476158 A | 12/2013 |
| CN | 104219797 A | 12/2014 |
| CN | 204259876 U | 4/2015 |
| CN | 104902594 A | 9/2015 |
| CN | 105120536 A | 12/2015 |
| CN | 105188164 A | 12/2015 |
| FR | 2818087 A1 | 6/2002 |
| FR | 2837344 A3 | 9/2003 |
| FR | 2896766 B3 | 8/2007 |
| JP | H 03108294 A | 5/1991 |
| JP | H 05326114 A | 12/1993 |
| JP | 2003109728 A | 4/2003 |
| JP | 2003109729 A | 4/2003 |
| JP | 2012023166 A | 2/2012 |
| JP | 2015-096562 | 5/2015 |
| KR | 2014/0134760 A | 11/2014 |
| KR | 101468637 B1 | 12/2014 |
| WO | WO 2005/119930 A2 | 12/2005 |

OTHER PUBLICATIONS

An et al., Eur. Polm. J., 49(6), 1322-1330 (2013).
Shin et al., J. Mater. Chem., 22, 23404-23410 (2012).
Kilduff et al., Journal of Science and Medicine in Sport 16, 482-486 (2013).
Russell et al., PLoS ONE, 10(3) (2015).

* cited by examiner

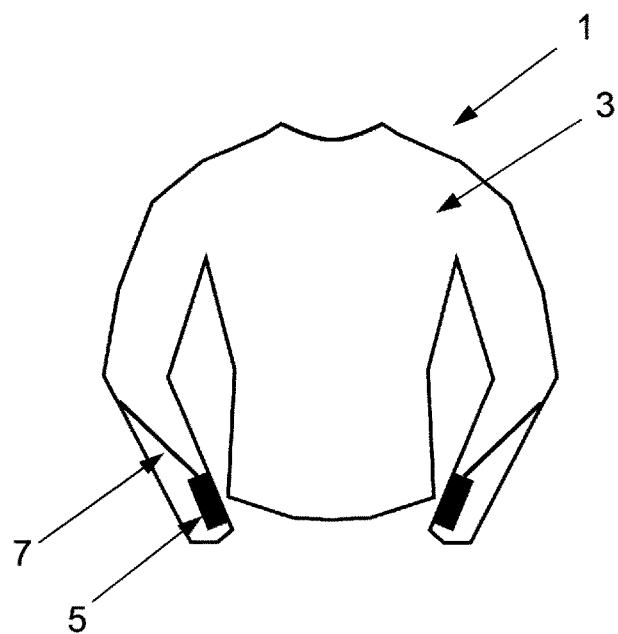
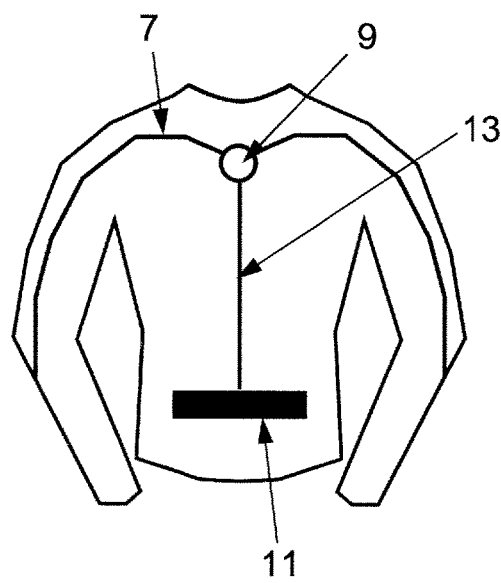
FIGURE 1A
FIGURE 1B
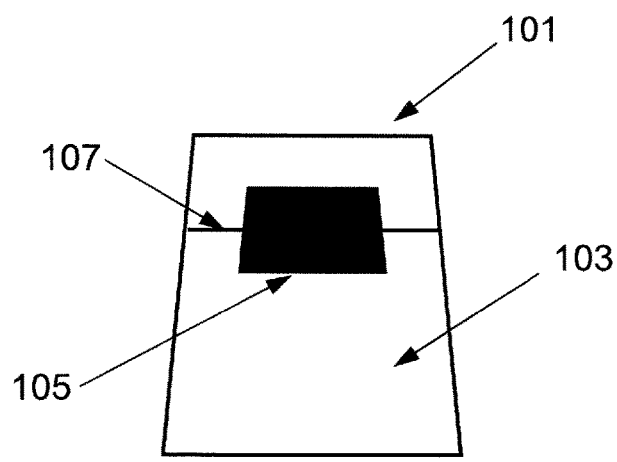
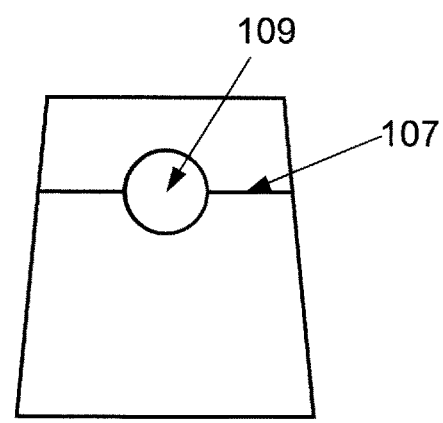
FIGURE 2A
FIGURE 2B

HEATABLE GARMENT, FABRICS FOR SUCH GARMENTS, AND METHODS OF MANUFACTURE

CROSS REFERENCE TO RELATED APPLICATIONS

This application is a § 371 National State Application of PCT/EP2017/051621 filed Jan. 26, 2017, which claims priority to GB 1601370.8 filed Jan. 26, 2016.

FIELD OF THE INVENTION

The present invention relates to heatable garments, fabrics for making such garments and methods for making such garments and fabrics. The invention also provides heatable bedding.

BACKGROUND

Many of the most popular sporting and leisure pursuits take place in cold environments, which challenge the body's thermoregulatory system. As air temperature drops, this causes vasoconstriction of the blood vessels near the skin's periphery, which reduces blood flow to the skin and in turn causes peripheral blood flow to drop.

As well as causing discomfort, decreased body temperature leads to a reduction in dexterity. For example, it has previously been shown that cooling skin temperature to 13° C. results in a reduction in manual dexterity, and that individuals working in cold environments or handling cold products demonstrate decreased hand function.

This lack of dexterity is of particular significance in sporting applications. For example, in elite sport where a loss in hand dexterity could result in a mistake that could separate success from failure, the importance of maintaining hand skin temperature is clear. In addition, there is a well-reported correlation between muscle temperature, peak power output, repeated exercise ability and subsequent sporting performance. Cold environmental temperatures and periods of low to moderate inactivity, such as experienced following a warm up, while on the sidelines or during breaks in play, can cause a drop in muscle temperature. For example, studies have shown that there is a 4% decrease in leg peak power output for every 1° C. drop in muscle temperature, and have demonstrated a strong correlation between core and muscle temperature and performance. These effects are particularly pronounced at extreme low temperatures, such as those experienced at high altitudes and northern/southern latitudes.

Loss of dexterity and muscle performance can also be a significant problem in cold work environments. This is particularly true of jobs involving manual labour, such as construction, shipping, and refrigerated warehouses. To deal with cold environments, it is common for workers to wear thick or multiple layers of clothing. However, this can further exacerbate the loss of dexterity, and can result in decreased levels of productivity, comfort and safety.

It is known to provide heated garments to try to heat specific areas of the body. For example, WO 2005/119930 describes forming molded heating elements and attaching them to a garment using adhesive or sewing, or holding them within a pocket in the garment (see FIG. 7 of WO 2005/119930). However, the use of molded heating elements can increase the bulk of the heating elements, negatively impacting the flexibility of garments incorporating such elements.

Another known heated garment is formed by adding conventional wire resistance heaters to clothing. Such garments typically have wires tightly packed in parallel lines across athe area to be heated, in so-called "serpentine" paths, so as to spread the supplied heat across the target area. However, as well as being heavy and having high power consumption, these technologies are also susceptible to the creation of hot spots during flexing and general use, limiting the temperatures which these heaters can safely accomplish, their lifetime and general wearability.

It is also known to form heatable garments incorporating woven conductive fibres, which provide resistive heating upon application of a current. The fibres used in such garments typically are either metal (such as copper or nichrome wire), or an insulating material coated in a conductive (e.g. metal) material. Such materials can be difficult and expensive to produce, and the use of such fibres can negatively impact the flexibility and/or stretchability of the garment.

However, there remains a need to develop improved heatable garments, and fabrics suitable for making such garments.

SUMMARY OF THE INVENTION

In a first aspect, the present invention provides a heatable garment, comprising a garment body and a heating pad adhered to at least a portion of the garment body, wherein the heating pad comprises graphene particles dispersed in a polymer matrix material.

By "adhered" we mean that the heating pad is bonded to the garment body either directly or indirectly. That is, the heating pad is either bonded to the garment body itself without any intermediate layer (i.e. "directly" adhered to the surface), or bonded to the garment body via one or more intermediate layers (i.e. "indirectly" adhered to the surface).

The "heating pad" is an electrical heating pad, i.e. an electrically conductive material which is able to generate heat upon application of an electrical current. The heating pad takes the form of one or more layers adhered to the surface of the garment body.

By "garment body", we mean the clothing material which forms the structure of the garment, e.g. one or more fabric panels which are connected (e.g. stitched) together into a garment.

The heatable garment of the present invention has a number of advantageous features.

Firstly, the heatable garment provides a cost effective and simple way of heating the body. In particular, the heating pad is made from carbon (in the form of graphene particles) and polymer, which are relatively low cost compared to known heating pads based on, for example, metals such as silver.

Secondly, the graphene particles display high conductivity, meaning that they can form a suitably conductive heating pad at relatively low loading levels in the polymer matrix material. These low loading levels mean that the mechanical properties of the heating pad can be dominated by the relatively more flexible polymer matrix material, instead of the less flexible graphene particles. The small size of the graphene particles also lessens the impact of the particles on the mechanical properties of the heating pad compared to relatively larger particles.

Thirdly, adhering the heating pad to the garment body helps the heating pad to flex and adapt to deformation of the garment, whilst maintaining the heating pad in close proximity with the wearer of the garment. This arrangement can be more effective than, for example, garments in which a heating pad is held within a fabric pocket, where deformation of the garment does not so easily translate into deformation of the heating pad, and hence where deformation of the garment can result in the heating pad not conforming to the wearer of the garment.

Adhering the heating pad to the garment body also allows for a relatively compact construction. For example, the garment body provides structural reinforcement to the heating pad, meaning it can be made relatively thinner than a heating pad which is simply sewn to the garment or held in a pocket or pouch.

Fourthly, construction of the heatable garment is relatively simple. For example, the construction avoids the need to form a conductive fibre into the fabric of the garment itself, and avoids the need to form separate pouches or pockets in the garment for incorporation of the heating pad.

Fifthly, the graphene-based heating pad can have a rapid temperature response to applied voltages and good heat stability, even when flexing. For example, the inventors have found that graphene-based heating pads as used in the present invention can settle at an equilibrium temperature after approximately 20 seconds and will cool down within seconds of the voltage being removed. This is most probably due to the graphene nanoparticles' excellent thermal conductivity properties. This allows higher temperatures to be safely applied to an animal with a reduced risk of burning, since sudden temperature increases can be rapidly reduced by decreasing the applied voltage.

Sixthly, the uniformity of the heat distribution of a graphene-based heating pad compared to that of a traditional serpentine wire heater is improved, due to the ability to provide more even/uniform heat to an area. This again allows for a safer and more controlled application of heat for use upon an animal, since it reduces the likelihood of the formation of hot spots.

Furthermore, the power requirements of the heating pad are relatively low, due to the excellent electrical and thermal properties of the graphene particles dispersed in the polymer matrix. This means that the heating pad can be powered using small, lightweight (and hence easily transportable), long-lasting power supplies, thus improving the "wearability" and usability of the heated garments. Consequently, the heatable garments can be used for applications ill-suited to previous heatable garments. This is especially true of high performance sports applications, where benefits provided by heating systems can readily be outweighed by drawbacks associated with the size and weight of the systems.

The garment is for use by an animal. The animal may be, for example, a human or other mammal (e.g. dog or horse). The heatable garment is preferably heatable to body temperature, or just above body temperature, for the relevant animal. For example, when the heatable garment is for use by mammals, the garment is preferably heatable to temperatures in the range of 35° C. to 45° C. (~37° C. in the case of garments for human use).

Heating Pad

Preferably, the heating pad is a heatable coating bonded (directly or indirectly) to the garment body. A heating pad in the form of a heatable coating can be made relatively thinner than a heating pad in the form of a molded article which is subsequently adhered to the garment. Advantageously, decreasing the thickness of the heating pad helps to improve the pad's flexibility and stretchability. Preferably, the heatable coating is bonded directly to the garment body, since this results in a particularly compact construction.

Most preferably, the heating pad is or comprises one or more layers of an electrically conductive ink comprising graphene particles in a polymer matrix material which has been applied to a portion of the garment body. Preferably the conductive ink is applied directly to the garment body because the ink, when cured, adheres directly to the garment surface without the need for a separate adhesive. Advantageously, garments in which a conductive ink is applied to the garment body can be made relatively compact, and hence can have minimal impact on the mechanical properties of the garment. Furthermore, the heating pad can be formed by applying the ink to the area of interest, which is relatively straightforward compared to having to manufacture the heating pad as a separate part in the desired shape and size, before applying to the garment.

The heating pad produces heat through resistive heating upon application of an electrical current. The amount of heat generated is determined by the relationship: power=$V^2/R$.

To achieve safe and useful temperatures from suitable power supplies, the heating pad typically has a resistance of 500Ω or less, 400Ω or less, 300Ω or less, 200Ω or less, 150Ω or less, 100Ω or less, 75Ω or less, 50Ω or less, 40Ω or less, 30Ω or less, 20Ω or less, 15Ω or less, or 10Ω or less. Advantageously, smaller resistances require lower voltages to achieve a desired power level, and hence can run off a low voltage battery supply, which can improve safety and reduce the weight and bulk of the heatable garment.

The sheet resistance may be, for example, 200Ω/square or less, 150Ω/square or less, 100Ω/square or less, 75Ω/square or less, 50Ω/square or less, 40Ω/square or less, 30Ω/square or less, or 20Ω/square or less.

The heating pad used in the present invention may be a single layer of conductive material, or formed from multiple stacked layers (e.g. 2, 3, 4 or 5) of conductive material. Coating/printing multiple stacked layers to form the heating pad can result in a more uniform thickness (and hence more uniform heating) than coating/printing a single layer of the same overall thickness.

The average (mean) thickness of the heating pad (i.e. mean distance between the bottom surface of the heating pad and the top surface of the heating pad) may be, for example, less than 300 μm, less than 200 μm, less than 150 μm, preferably less than 100 μm or less than 75 μm. The lower limit for the average thickness of the heating pad may be, for example 1 μm, 3 μm, 5 μm or 10 μm. Preferably, the average thickness is 1 to 100 μm, more preferably 1 to 75 μm. In instances where the heating pad is formed from multiple layers, each layer may have a maximum average thickness of, for example, 50 μm, 25 μm, 15 μm, 10 μm or 5 μm. The minimum average thickness may be, for example, 0.5 μm, 1 μm, 3 μm or 5 μm. Preferably, the average thickness of each layer is 1 to 15 μm. Advantageously, such thicknesses allow the heating pad to be easily deformable, and provide sufficient resistance for the required heating whilst allowing a relatively thin device to be produced.

The heating pad may take the form of a line, sheet, or patch extending across the surface of the garment body. The surface area of the sheet may be, for example, 0.5 $cm^2$ or more, 1 $cm^2$ or more, 2 $cm^2$ or more, 3 $cm^2$ or more, 5 $cm^2$ or more, 10 $cm^2$ or more, 15 $cm^2$ or more, or 20 $cm^2$ or more.

The heating pad may be on the outside/exterior of the garment. Advantageously, in such embodiments, the garment body can electrically insulate the user from the heating pad, whilst still permitting heat transfer through the garment body.

Alternatively, the heating pad may be on the inside/interior of the garment, such that it is facing the wearer's body in use. Advantageously, this can allow the heating pad to be brought into closer proximity to the wearer than might be possible with a heating pad on the exterior of the garment body.

A further alternative is for the heating pad to be adhered within the garment body.

The heatable garment may comprise more than one of the heating pads described above, such as 2, 3, 4, 5, 6, 7, 8, 9 or 10 heating pads. For example, the heatable garment may have multiple heating pads targeting different muscle groups of the body, or different blood vessels of the body.

Graphene Particles

The heating pad used in the present invention comprises or consists essentially of graphene particles dispersed in a polymer matrix material. The graphene particles are conductive, and allow heating of the heating pad through resistive (Joule) heating.

The graphene particles may be randomly dispersed in the polymer matrix material. Providing carbon in this form instead of, for example, in the form of woven carbon microfibre sheets encased within a polymer matrix material, simplifies manufacture and reduces expense. Furthermore, the conductivity of graphene particles (which is higher than, for example carbon black and graphite) means that a conductive heating pad can be formed at relatively low loadings. In addition, using carbon particles in this form allows the heating pad to be applied using coating (e.g. printing) techniques, which simplifies manufacture compared to use of woven carbon microfibre, particularly when used to form complex shapes on the garment body.

Suitably, the graphene particles have a high aspect ratio. Advantageously, graphene particles having a high aspect ratio can form conductive paths at relatively low loading levels, helping to improve the flexibility of the heating pad.

The graphene particles (which can be referred to as "graphene-material particles", or "graphene-based particles") may take the form of monolayer graphene (i.e. a single layer of carbon) or multilayer graphene (i.e. particles consisting of multiple stacked graphene layers). Multilayer graphene particles may have, for example, an average (mean) of 2 to 100 graphene layers per particle. When the graphene particles have 2 to 5 graphene layers per particle, they can be referred to as "few-layer graphene".

Advantageously, these forms of carbon nanoparticles provide extremely high aspect ratio conductive particles. This high aspect ratio allows the formation of conductive paths at relatively low loading levels, decreasing the volume of the heating pad occupied by the carbon nanoparticles and thus increasing the flexibility/stretchability of the heating pad.

The graphene particles may take the form of plates/flakes/sheets/ribbons of multilayer graphene material, referred to herein as "graphene nanoplatelets" (the "nano" prefix indicating thinness, instead of the lateral dimensions).

The graphene nanoplatelets may have a platelet thickness less than 100 nm and a major dimension (length or width) perpendicular to the thickness. The platelet thickness is preferably less than 70 nm, preferably less than 50 nm, preferably less than 30 nm, preferably less than 20 nm, preferably less than 10 nm, preferably less than 5 nm. The major dimension is preferably at least 10 times, more preferably at least 100 times, more preferably at least 1,000 times, more preferably at least 10,000 times the thickness. The length may be at least 1 times, at least 2 times, at least 3 times, at least 5 times or at least 10 times the width.

The loading of graphene particles in the polymer matrix material may be, for example, 0.25 wt. % or more, 0.5 wt. % or more, 1 wt. % or more, 2 wt. % or more, 5 wt. % or more, 10 wt. % or more, 15 wt. % or more, 20 wt. % or more, 30 wt. % or more, 40 wt. % or more, 50 wt. % or more or 60 wt. % or more of the total weight of the heating pad. The upper limit for the loading of graphene particles in the polymer matrix material may be, for example, 1 wt. %, 2 wt. %, 5 wt. %, 10 wt. %, 15 wt. %, 20 wt. %, 30 wt. %, 40 wt. % 50 wt. %, or 60 wt. % or 70 wt. %. If the loading of graphene particles is too low then the resistance of the heating pad will be high, necessitating greater voltages to achieve a desired temperature. If the loading is too high, then this can adversely affect the mechanical properties of the heating pad (in particular, flexibility and stretchability), and hence the mechanical properties of the heatable fabric. For these reasons, it is preferable for the loadings of the graphene particles to be in the range of, for example, 5 to 50 wt. %, 10 to 40 wt. %, or 20 to 40 wt. %.

The graphene particles are preferably uniformly dispersed throughout the polymer matrix material, since aggregates (clumps) of material may decrease the uniformity of heating of the fabric in use. However, it is not straightforward to achieve a suitably uniform dispersion of graphene particles since such particles have a powerful tendency to agglomerate, and are difficult to disperse in solvents and polymer materials.

Preferably, the graphene particles are functionalised graphene particles, e.g. functionalised graphene or functionalised graphene nanoplatelets. That is, the graphene particles incorporate functional groups which improve the affinity of the nanoparticles for the solvents and/or polymer matrix material used to form the heating pad, thus allowing a more uniform distribution of particles to be achieved. For example, the graphene particles may be oxygen-functionalised, hydroxy-functionalised, carboxy-functionalised, carbonyl-functionalised, amine-functionalised, amide-functionalised or halogen-functionalised.

Preferably, the functionalised graphene particles are plasma-functionalised graphene particles (i.e. particles which have been functionalised using a plasma-based process). Advantageously, plasma-functionalised graphene particles can display high levels of functionalisation, and uniform functionalisation.

In particular, the inventors have found that when graphene particles are prepared using agitation in low-pressure plasma, such as described in WO2010/142953 and WO2012/076853, they are readily obtained in a format enabling dispersion in solvents and subsequently in polymer matrices, or directly in polymer melts, at good uniformity and at levels more than adequate for the purposes set out above. This is in contrast to conventional processes for separating and functionalising graphene particles, which are extreme and difficult to control, as well as damaging to the particles themselves.

Specifically, the starting carbon material—especially graphitic carbon bodies—is subjected to a particle treatment method for disaggregating, de-agglomerating, exfoliating, cleaning or functionalising particles, in which the particles for treatment are subject to plasma treatment and agitation in a treatment chamber. Preferably the treatment chamber is a rotating container or drum. Preferably the treatment chamber contains or comprises multiple electrically-conductive solid contact bodies or contact formations, the particles being agitated with said contact bodies or contact formations and in contact with plasma in the treatment chamber.

The particles to be treated are carbon particles, such as particles which consist of or comprise graphite, or other nanoparticles.

Preferably the contact bodies are moveable in the treatment chamber. The treatment chamber may be a drum, preferably a rotatable drum, in which a plurality of the contact bodies are tumbled or agitated with the particles to be treated. The wall of the treatment vessel can be conductive and form a counter-electrode to an electrode that extends into an interior space of the treatment chamber.

During the treatment, desirably glow plasma forms on the surfaces of the contact bodies or contact formations.

Suitable contact bodies are metal balls or metal-coated balls. The contact bodies or contact formations may be shaped to have a diameter, and the diameter is desirably at least 1 mm and not more than 60 mm.

The pressure in the treatment vessel is usually less than 500 Pa. Desirably during the treatment, gas is fed to the treatment chamber and gas is removed from the treatment chamber through a filter. That is to say, it is fed through to maintain chemical composition if necessary and/or to avoid build-up of contamination.

The treated material, that is, the particles or disaggregated, deagglomerated or exfoliated components thereof resulting from the treatment, may be chemically functionalised by components of the plasma-forming gas, forming e.g. carboxy, carbonyl, hydroxyl, amine, amide or halogen functionalities on their surfaces. Plasma-forming gas in the treatment chamber may be or comprise e.g. any of oxygen, water, hydrogen peroxide, alcohol, nitrogen, ammonia, amino-bearing organic compound, halogen such as fluorine, halohydrocarbon such as $CF_4$, and noble gas. Oxygen-functionalised materials, plasma-processed in oxygen, or oxygen-containing gas, are particularly preferred.

Any other treatment conditions disclosed in the above-mentioned WO2010/142953 and WO2012/076853 may be used, additionally or alternatively. Or, other means of functionalising and/or disaggregating carbon particles may be used for the present processes and materials, although we strongly prefer plasma-treated materials.

For the present purposes the type and degree of chemical functionalisation of the graphene particles is selected for effective compatibility at the intended loadings with the selected polymer matrix material. Routine experiments may be effective to determine this.

Other forms of conductive particle filler may be used in the heating pad alongside the graphene particles. For example, the heating pad may further comprise carbon nanotubes (single-walled or multi-walled), carbon black, or metal particles (e.g. silver particles).

Polymer Matrix Material

Suitably, the polymer matrix material of the heating pad is an elastic material. The particular choice of elastic material is not particularly limited, provided that it is sufficiently elastically deformable at normal operating conditions of the garment, and holds the graphene particles in position (so that the distribution of graphene particles does not change over time).

Suitable materials include, for example, vinyl polymers (including polymers or copolymers of vinyl chloride, vinyl acetate and vinyl alcohol), polyester polymers, phenoxy polymers, epoxy polymers, acrylic polymers, polyamide polymers, polypropylenes, polyethylenes, silicones, elastomers such as natural and synthetic rubbers including styrene-butadiene copolymer, polychloroprene (neoprene), nitrile rubber, butyl rubber, polysulfide rubber, cis-1,4-polyisoprene, ethylene-propylene terpolymers (EPDM rubber), and polyurethane (polyurethane rubber). The polymer matrix material may be, for example, a copolymer of vinyl chloride, vinyl acetate and/or vinyl alcohol.

The polymer matrix material may be a thermoplastic material. Alternatively, the polymer matrix material may be a thermosetting material.

The polymer matrix material may comprise or be polyurethane, for example a thermoplastic polyurethane elastomer. Advantageously, the present inventors have found that using polyurethane (especially thermoplastic polyurethane elastomer) as the polymer matrix material produces heating pads with good mechanical properties, in particular a good level of flexibility. This helps the heating pad to conform to the body of the garment's wearer during use.

Garment Body

The portion of the garment body to which the heating pad is adhered is made from a clothing material, preferably a fabric. The fabric may be a woven, crocheted, knitted or non-woven fabric formed from fibres/yarns. Preferably, the fabric is a woven fabric.

The portion of the garment body to which the heating pad is adhered may be formed from natural or synthetic material. For example, the said portion of the garment body may comprise of consist of natural fibres (e.g. cotton, wool, flax, silk), or a natural material such as leather. Additionally or alternatively, the said portion of the garment body may comprise or consist of synthetic fibres (polyester fibres, polyester-polyurethane copolymers such as Lycra®, acrylic fibres, and polyamide fibres such as nylon), or a non-foam or (more preferably) foamed polymer such as neoprene.

Preferably, the garment body is flexible (i.e. capable of bending and returning to its original shape without breaking). Optionally, the garment body is stretchable (i.e. capable of being made longer or wider without tearing or breaking). Garments formed from flexible and/or stretchable materials are able to conform to a user's body as they move.

Preferably, the garment body is permeable to the material used to form the heating pad (e.g. conductive ink) such that said material permeates/infiltrates the garment body during formation. For example, the garment body may be made from a woven or non-woven fabric through which the heating pad permeates during construction. This can ensure a good bond between the heating pad and garment body.

When the garment body is made from fibres/yarns, the fibres/yarns may be permeable to the material used to form the heating pad (e.g. conductive ink) such that said material permeates/infiltrates the fibres/yarns during formation. Again, this ensures a good bond between the heating pad and garment body.

The heating pad may be adhered to a detachable part of the garment body i.e., a part of the garment body which can be detached from other parts of the garment body. In such instances, it is preferred that the detachable part of the garment body is reversibly detachable. For example, the heating pad may be provided on a detachable strap or pad. The detachable part of the garment body may be held in place by a reusable fastener, such as a hook-and-loop fastener (e.g. Velcro®), a button, a press stud, a buckle, or zip. Advantageously, such an arrangement can allow the heating pad to be replaced (e.g. when the power supply is low, or there is a fault with the heating pad) or removed (e.g. for cleaning). Alternatively the heating pad may be adhered to a non-detachable part of the garment body.

Covering Layer

Preferably, the heatable garment comprises an electrically-insulating covering layer, overlaying (e.g. encapsulating) and bonded to the heating pad. Advantageously, the electrically-insulating covering layer helps to improve the mechanical properties of the heatable garment. In particular, it reduces the occurrence of cracking of the heating pad upon deformation of the garment. Furthermore, the electrically-insulating covering layer helps to electrically insulate the user from the heating pad, and prevents short-circuits forming when different regions of the heating pad are brought into contact (which might otherwise lead to non-uniform heating). In addition, the electrically-insulating covering layer can protect the heating pad from damage, e.g. by water during a wash process, and can allow higher temperatures to be achieved.

The electrically-insulating covering layer may be adhered to the heating pad. Most preferably, the electrically-insulating covering layer is coated (e.g. printed) on the heating pad.

Preferably, the electrically-insulating covering layer is formed from an elastic material, e.g. an elastic polymer. This allows the covering layer to mechanically adapt as the wearer of the garment moves, increasing comfort for the wearer.

Suitable materials include, for example, vinyl polymers (including polymers or copolymers of vinyl chloride, vinyl acetate and vinyl alcohol), polyester polymers, phenoxy polymers, epoxy polymers, acrylic polymers, polyamide polymers, polypropylenes, polyethylenes, silicones, elastomers such as natural and synthetic rubbers including styrene-butadiene copolymer, polychloroprene (neoprene), nitrile rubber, butyl rubber, polysulfide rubber, cis-1,4-polyisoprene, ethylene-propylene terpolymers (EPDM rubber), and polyurethane (polyurethane rubber). The polymer matrix material may be, for example, a copolymer of vinyl chloride, vinyl acetate and/or vinyl alcohol.

Preferably, the electrically-insulating covering layer is formed from a coatable material, such as a polymer ink. For example, the layer may be formed by polymer ink comprising a suspension of polymer particles in a liquid plasticizer (for example "Plastisol®"—a suspension of PVC particles in a liquid plasticizer), which can be printed and cured, for example, by heating.

The electrically-insulating covering layer may comprise or be formed from polyurethane, for example a thermoplastic polyurethane elastomer. Advantageously, the present inventors have found that using polyurethane (especially thermoplastic polyurethane elastomer) as the electrically-insulating covering layer produces heatable garments with good mechanical properties, in particular a good level of flexibility. This helps the heatable garment to conform to the body of the garment's wearer during use.

The electrically-insulating covering layer may be, or comprise, silicone rubber, since this can provide excellent flexibility and deformability without cracking.

Alternatively, or in addition, the heatable garment may include an electrically insulating covering layer bonded to the garment body underneath the heating pad (i.e. on the opposite side of the garment body to the side on which the heating pad is provided). For example, the heatable garment may have electrically-insulating covering layers bonded to both sides of the garment body in the portion of the garment body provided with the heating pad, such that the heating pad and garment body are sandwiched between electrically-insulating layers. In such embodiments, the covering layers may form a watertight seal around the heating pad.

Intermediate Layer

Optionally, the heatable garment comprises an intermediate layer between the garment body and the heating pad. In such instances, the heating pad is indirectly adhered to the garment body, with the heating pad adhered to the intermediate layer which is itself adhered to the garment body. Advantageously, the intermediate layer may provide a uniform surface for adherence of the heating pad to the garment body. In addition, the intermediate layer can reduce the mechanical stresses on the heating pad as the garment is deformed, especially for fabric materials where fibres can move relative to one another.

The intermediate layer may be coated (for example, printed) on the garment body directly. For example, the heatable garment may have an intermediate layer coated on the garment body, with the heating pad coated directly on the intermediate layer. Alternatively, the intermediate layer may be a pre-formed sheet of material which is adhered to the heatable garment, for example, through the application of heat (e.g. from an iron).

The intermediate layer may be an electrically-insulating intermediate layer.

Preferably, the intermediate layer is formed from an elastic material, e.g. an elastic polymer. Suitable materials include those mentioned above for the covering layer. For example, the intermediate layer may be, or comprise, silicone rubber, since this can provide excellent flexibility and deformability without cracking. A further preferred material for the intermediate layer is polyurethane, for example a thermoplastic polyurethane elastomer. Advantageously, the present inventors have found that incorporating an intermediate layer formed from polyurethane (especially thermoplastic polyurethane elastomer) leads to heatable garments with good mechanical properties, in particular a good level of flexibility. This helps the heatable garment to conform to the body of the garment's wearer during use.

In embodiments comprising both an electrically-insulating covering layer and an intermediate layer, both of said layers may be made of the same material, e.g. silicone rubber or, preferably, polyurethane. In instances where both layers are formed from polyurethane (e.g. thermoplastic polyurethane), the heatable garment can have particularly good mechanical properties (in particular, flexibility and conformability).

In embodiments comprising both an electrically-insulating covering layer and an intermediate layer, the electrically-insulating covering layer and intermediate layer may encapsulate the heating pad. In such situations, the electrically-insulating covering layer and intermediate layer may form a waterproof seal around the heating pad.

The intermediate layer may be porous/permeable. This can allow water to be taken up by the intermediate layer, which can help to draw moisture (e.g. sweat) away from the user, e.g. by "wicking". Advantageously, allowing liquid, such as sweat, to enter the intermediate layer can help to improve the thermal conductivity of the intermediate layer.

Heat-Reflective Layer

Optionally, the garment may include a heat-reflective layer to direct heat generated by the heating pad towards the body. For example, the garment may have a metal foil (e.g. aluminium foil) on the exterior of the garment to reflect heat from the heating pad towards the body.

Electrical Connectors

The heatable garment may include electrical connectors on (e.g. abutting/overlaying) the heating pad to facilitate connection of an electrical power supply. For example, the heatable garment may include one or more metal (e.g. silver) regions on the heating pad to facilitate supply of electricity to the heating pad. Advantageously, these electrical connectors can simplify supply of power to the heating pad, and can reduce the resistance of the heating pad.

The one or more electrical connectors may take the form of points, or lines/tracks, optionally formed into a pattern. For example, the electrical connectors may take the form of spaced lines.

Power Supply

The heatable garment of the present invention is connectable to an electrical power supply. The heatable garment may include the electrical power supply, or it may be supplied without the electrical power supply installed.

The electrical power supply may be a battery (for example, a button cell battery), or a supercapacitor.

Preferably, the heatable garment is heatable to body temperature of the relevant animal upon application of power from the power supply. For mammals, this means that the heater is heatable to temperatures in the range of 35° C. to 45° C. (~37° C. in the case of fabrics for human use). For the avoidance of doubt, the temperatures above refer to the temperature of the heatable garment itself (as opposed to the temperature at a distance from the heatable garment), as measured, for example, via a thermal imaging camera.

The maximum temperature achievable by the heater upon supply of power from the power supply may be 200% or less of normal body temperature, 175% or less of normal body temperature, 150% or less of normal body temperature, 125% or less of normal body temperature, or 110% or less of normal body temperature (based on calculations using body temperature expressed in ° C.). For example, the maximum temperature achievable by the heater upon supply of power from the power supply may be 70° C. or less, 60° C. or less, 55° C. or less, 50° C. or less, 45° C. or less, or 40° C. or less. These values are based on normal operation of the device (as opposed to temperatures achieved in the event that the device malfunctions). Advantageously, designing the heatable garment to have a maximum temperature in the ranges above limits or prevents the possibility of the heatable garment damaging a wearer of the garment.

Most preferably, the heatable garment is heatable to a temperature just below (for example, <2° C. below, such as 1-2° C. below) the temperature at which thermal burning of skin occurs. For example, in humans, it is preferable that the heatable garment is heatable to temperatures of 42 to 43° C. (just below the thermal burn temperature of 44° C. for human skin). The heatable garment may be configured such that the maximum temperature to which the garment can be heated is just below the temperature at which thermal burning of skin occurs, for example, 0.5 to 5° C. below, preferably 1 to 3° C. below, more preferably 1 to 2° C. below the thermal burning temperature.

In embodiments comprising an electrically-insulating covering layer, said layer may cover the power supply. In embodiments in which the heating pad is encapsulated by electrically-insulating covering layers and/or an intermediate layer, said layers may also encapsulate the the power supply. In such situations, the electrically-insulating covering layers and/or intermediate layer may form a waterproof seal around the heating pad and power supply. In such embodiments, the power supply may be rechargeable via electrical induction.

Control

The heatable garment may comprise a temperature control system, to control the temperature of the heating pad. For example, the control system may allow the amount of power supplied to the heating pad to be adjusted, e.g. in a stepped or continuous manner. This may control switching on and off of the heating pad and/or switching between lower and high power settings.

In embodiments in which the heatable garment comprises multiple heating pads, the control system may allow independent control over the temperature of each, or a subset of, the heating pads. For example, in a heatable garment comprising multiple heating pads which target different muscle groups, the control system may allow the temperature of heating pads to be independently adjusted according to the muscle group.

The control system may include an interface (such as a button, switch, or dial) for a user to adjust the temperature of the heating pad(s). In addition, or alternatively, the control system may be programmable to adjust the power level according to a pre-determined program. In this way, heating provided by the heatable garment can be customised to a particular individual, or application.

Preferably, the control system is configured so that the temperature of the heating pad cannot exceed a certain threshold (as per the temperature ranges mentioned above). Furthermore, the control system may include a cut-off feature, which reduces or stops power supply when a certain temperature is reached.

The control system may be configured to control the temperature of the heating pad by voltage regulation, a positive temperature coefficient (PTC) thermistor, or by varying the duty cycle of the power supply.

Types of Garment

The heatable garment may be a garment for human use, such as outerwear, underwear, armwear, neckwear, footwear, or headwear.

For example, the garment may be a top (e.g. vest, jersey, short-sleeve t-shirt, long-sleeve t-shirt, jacket), bottoms (e.g. shorts, trousers, hosiery/legwear such as stockings), an item of underwear (e.g. underpants, socks), a one-piece (e.g. swimsuit, leotard), a shoe (e.g. trainers, boots), a strap or belt (e.g. wristband, or strap/belt which can be fixed around a user, e.g. using a fixture such as velcro) an item of headgear (e.g. hat, helmet, or headband), a glove (e.g. cycling gloves, baseball glove), a wetsuit, or a drysuit. The above terminology is based on normal U.K. English usage, and the skilled reader will understand that certain of the above items may be given different names in other English-speaking countries, such as the U.S.

Most preferably, the article is a sports garment.

Suitably, the heating pad is positioned on the garment so as to provide heat to one or more specific areas of the body, such as specific muscles, parts of the vasculature, ligaments, tendons, joints or organs.

The garment may be for human use which covers the wrist of a user when worn (for example, a long-sleeve shirt, long-sleeve t-shirt, long-sleeve jacket; a wristband; or a glove), with at least one heating pad overlaying the wrist. In such garments, the heating pad preferably overlays the anterior portion of the wrist (i.e. the palmar side, or underside), since heat application to this portion of the body is particularly effective at raising the temperature of the hands, due to the thin skin covering the major blood vessels in this region.

For example, the garment may be a glove or wristband having a heating pad overlaying the anterior portion of the wrist, connected to a power supply overlaying the posterior portion of the wrist (i.e. the dorsal side, or back of the wrist). Advantageously, this arrangement means that the power supply causes little irritation to the user whilst allowing heating of blood to the hand via the thin skin overlying the wrist.

The garment may include a pocket for a user's hands, with the heating pad included in the pouch of the pocket.

The garment may be a pair of trousers or shorts, with heating pads targeting specific areas of the leg, such as the thigh, hamstring and/or calf.

The garment may be a top, with heating pads targeting specific areas of the arm and torso, such as the wrist, biceps, triceps, shoulders, back and/or pectoral muscles.

The garment may be a strap/belt/band which can be attached to (e.g. wrapped around) a specific part of the body. Such a garment may be attached to the body via a suitable fastener, such as a hook-and-loop fastener (e.g. Velcro®), a button, a press stud, a buckle, or zip. Advantageously, such a garment can be moved between different parts of the body, making it particularly useful for targeting tight or injured muscles.

The garment may be for use by a non-human applications, such as a horse blanket or dog jacket.

In a second aspect, the present invention comprises a heatable bedding, comprising a bedding body and a heating pad adhered to at least a portion of the bedding body, wherein the heating pad comprises graphene particles dispersed in a polymer matrix material. The bedding may be, for example, a blanket, a bed sheet, a duvet, a quilt, or a sleeping bag. The heatable bedding may have any of the features discussed above in relation to the first aspect.

Heatable Fabric

In a third aspect, the present invention provides a heatable fabric, suitable for forming a heatable garment of the first aspect or heatable bedding of the second aspect, comprising a heating pad adhered to at least a portion of a fabric substrate, wherein the heating pad comprises graphene particles dispersed in a polymer matrix material.

Preferably, the heating pad is a heatable coating bonded (directly or indirectly) to the fabric substrate. A heating pad in the form of a heatable coating can be made relatively thinner than a heating pad in the form of a molded article which is subsequently adhered to the fabric substrate. Advantageously, decreasing the thickness of the heating pad helps to improve the pad's flexibility and stretchability. Preferably, the heatable coating is bonded directly to the fabric substrate, since this results in a particularly compact construction.

Most preferably, the heating pad is or comprises a layer of an electrically conductive ink comprising graphene particles in a polymer matrix material which has been applied to a portion of the fabric substrate. In this case, when the ink cures it can adhere directly to the fabric substrate without the need for a separate adhesive. Advantageously, fabrics in which a conductive ink is applied to the fabric substrate can be made relatively compact.

Preferably, the heatable fabric comprises an electrically-insulating covering layer, overlaying (e.g. encapsulating) the heating pad. The covering layer may have any of the optional or preferred features of the covering layer mentioned above.

The fabric substrate may be a woven or non-woven fabric. The fibres making such a fabric may be natural or synthetic fibres, such as cotton, wool, flax, silk, polyester, polyester-polyurethane copolymers, acrylic, or polyamide.

The components of the heatable fabric may have any of the optional or preferred features mentioned above in relation to the garment body.

Manufacturing Methods

In a fourth aspect, the present invention provides a method of making a heatable garment, comprising:
 providing a clothing material; and
 depositing one or more layers of a conductive material onto at least a portion of the clothing material to form a heating pad;
 wherein the conductive material comprises graphene particles dispersed in a polymer matrix material.

The step of depositing one or more layers of a conductive material over the clothing material preferably involves depositing (coating) a conductive ink on the clothing material. Suitable deposition techniques include, for example, bar coating, screen printing (including rotary screen printing), flexography, rotogravure, inkjet, pad printing, and offset lithography. The conductive ink comprises the graphene particles dispersed in a solvent and polymer material.

When multiple layers of conductive ink are printed, each layer is preferably dried before a subsequent layer is added. The device may be heated after the application of each conductive ink layer to speed up drying of the ink.

When using a conductive ink, the method preferably involves a step of preparing the ink for printing. This preparation step may involve mixing or homogenising the ink to evenly distribute the graphene particles in the ink's polymer binder. Preferably, the preparation step involves homogenising the ink, since the inventors have found that this ensures a uniform distribution of carbon nanoparticles and can help to break up agglomerates of nanoparticles in the ink. Suitable homogenisation can be achieved using, for example, a three roll-mill or rotor-stator homogeniser.

The method may be carried out on a pre-formed garment, in which case the method involves:
 providing a garment body, formed from clothing material; and
 depositing one or more layers of a conductive material onto at least a portion of the garment body to form a heating pad.

Alternatively, the garment may be formed after deposition of the conductive material, in which case the method involves:
 providing a clothing material;
 depositing one or more layers of a conductive material onto at least a portion of the clothing material to form a heating pad;
 forming the clothing material into a garment.

When the conductive material is a conductive ink, it is preferable that the clothing material be permeable to said conductive ink (i.e. penetrates into the clothing material, beyond the surface of the clothing material). This can allow improved bonding between the clothing material and the heating pad.

In such embodiments, the method preferably involves:
 providing a clothing material;
 depositing a conductive ink (as defined above) onto at least a portion of the clothing material and allowing the ink to at least partially permeate (i.e. soak into) into the clothing material;
 removing excess ink from the clothing material;
 curing the ink so as to form a first layer of conductive material; and
 optionally depositing further layers of conductive material on the first layer of conductive material.

Allowing the conductive ink to partially permeate into the clothing material helps to ensure a good bond between the clothing material and the heating pad.

The time allowed for the ink to permeate into the clothing material (the "ink permeation time") will vary depending on the type of clothing material and type of conductive ink. The ink permeation time may be, for example, 10 seconds or more, 20 seconds or more, 30 seconds or more, 1 minute or more, 2 minutes or more, 3 minutes or more, 5 minutes or more, 10 minutes or more, 20 minutes or more, or 30 minutes or more.

The ink may permeate to an average (mean) depth of, for example, 0.2 µm or more, 0.5 µm or more, 1 µm or more, 2

µm or more, 3 µm or more, 4 µm or more, 5 µm or more, 8 µm or more, 10 µm or more, 25 µm or more, 50 µm or more or 100 µm or more. The upper limit for the average (mean) permeation depth of the ink may be, for example 100 µm, 250 µm or 500 µm.

The ink may penetrate to an average (mean) depth which corresponds to 5% or more, 10% or more, 25% or more, 40% or more, 50% or more, or 75% or more of the overall thickness of the clothing material (as measured in the region of the ink penetration). For example, the ink may penetrate to an average (mean) depth which corresponds to between 5-75%, 10-50%, or 10-25% of the overall thickness of the clothing material.

When the conductive material is a conductive ink the clothing material is preferably permeable to a solvent which is compatible (e.g. miscible) with the conductive ink, and the clothing material is wetted with said solvent before deposition of the conductive ink.

For example, the method may involve:
providing a clothing material;
depositing a solvent onto at least a portion of the clothing material and allowing the solvent to at least partially permeate the clothing material so as to form a wetted clothing material;
depositing a conductive ink (as defined above) onto the wetted clothing material;
optionally, allowing the ink to at least partially permeate the clothing material;
removing excess ink from the clothing material; and
curing the ink so as to form a first layer of conductive material; and
optionally depositing further layers of conductive material on the first layer of conductive material.

The inventors have found that "wetting" the clothing material with solvent before application of the conductive ink helps to improve permeation/penetration of the conductive ink into the clothing material, and thus improve the bond of the heating pad to the clothing material.

The solvent may be an organic solvent which is miscible with the conductive ink. The solvent may be selected from, for example, alcohols, ethers, and esters. Specific examples include, for example, aldols such as diacetone alcohol (4-hydroxy-4-methylpenta-2-one); dimethyl esters, including mixtures of dimethyl esters (for example, "Estasol™"—a mixture of dimethyl esters of adipic, glutaric and succinic acids); or glycol ethers, such as dipropylene glycol monomethyl ether.

The time allowed for the solvent to permeate into the clothing material (the "solvent permeation time") will vary depending on the type of clothing material and type of conductive ink. The ink permeation time may be, for example, 10 seconds or more, 20 seconds or more, 30 seconds or more, 1 minute or more, 2 minutes or more, 3 minutes or more, 5 minutes or more, 10 minutes or more, 20 minutes or more, or 30 minutes or more. The solvent may be left for a sufficient time for it to permeate (soak through) the full thickness of the clothing material before application of the conductive ink.

Preferably, the clothing material is held taut during deposition of the conductive material, for example, through using a tenter. In particular, when the clothing material is stretchable, it is preferred that the material is in a stretched (e.g. partially stretched) state during deposition of the conductive material, since this can allow a more uniform deposition of conductive material.

The methods above may also involve depositing a layer of elastomeric material on the clothing material to provide a surface for subsequent deposition of the conductive material. Such a layer corresponds to the "intermediate layer" discussed above, and may have any of the features described above in relation to the intermediate layer. This elastomeric material may be coated onto the clothing material. Alternatively, the elastomeric material may be a pre-formed sheet which is adhered to the clothing material, for example, through the application of heat (e.g. an iron).

The methods above may also involve depositing an electrically-insulating coating layer over the heating pad. Such an electrically-insulating coating layer may have any of the features described above in relation to the first aspect of the invention. The electrically-insulating coating layer may be coated over the heating pad.

In a fifth aspect, the invention provides a method of forming a heatable fabric, comprising:
providing a fabric substrate; and
coating (e.g. printing) at least a portion of the fabric substrate with a heating pad, wherein the heating pad comprises graphene particles dispersed in a polymer matrix material.

The method of forming a heatable fabric may have any of the optional and preferred features described above for formation of the heatable garment. For example, the methods may involve the steps of applying (e.g. coating/printing) an electrically-insulating coating layer after formation of the heating pad and/or applying (e.g. coating printing) an intermediate layer on the clothing material before application of the conductive material.

The present invention also provides methods of forming heatable bedding following analogous methods to those described above in relation to heatable garments.

BRIEF DESCRIPTION OF THE FIGURES

Embodiments of the invention will now be described, by way of example only, with reference to the accompanying drawings in which:

FIGS. 1A and 1B are respectively front and rear views of a long-sleeved sports vest according to the present invention, having heating pads adhered to the wrist area and back of the garment;

FIGS. 2A and 2B are respectively front and rear views of a wristband according to the present invention;

DETAILED DESCRIPTION

Figure 3:
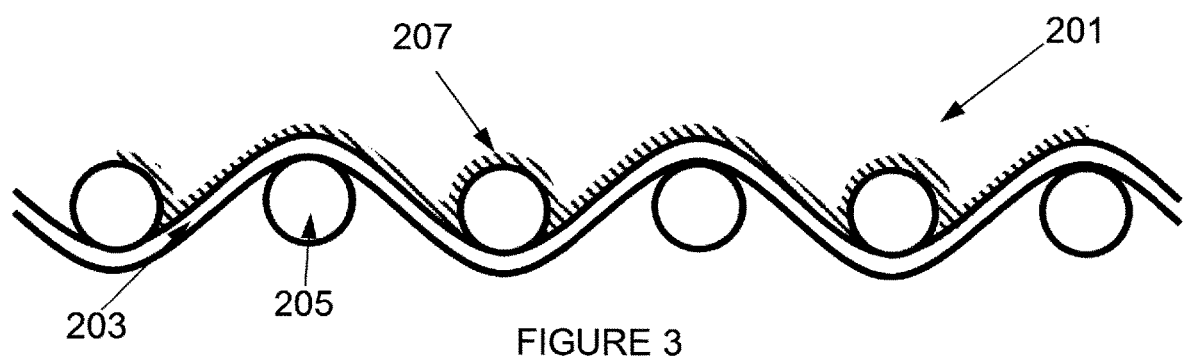
FIGS. 3 and 4 are cross-sectional views of a garment of the present invention, showing a woven fabric over-printed with conductive ink.

FIGS. 1 and 2 show garments according to the present invention, which are capable of heating a user's blood via the anterior portion of the wrist.

FIG. 1A shows a long-sleeved sports vest 1 formed from a lightweight flexible fabric base material 3 (the garment body). The wrist area on each arm of the vest includes heating pads 5 which are positioned so as to overlay the anterior portion of the wrist during normal use. The heating pads 5 have been formed by coating a single layer of conductive ink (comprising graphene nanoplatelets dispersed in a polymer binder and solvent) onto the relevant portion of the outside of the garment, and allowing the ink to cure. The heating pads are covered with a layer of silicone elastomer to improve the thermal properties of the ink, and electrically insulate the wearer from the heating pad.

The heating pads are linked to a button-type battery 9 on the rear of the garment via conductive tracks 7, as shown in FIG. 1B. In this case, the tracks are formed from the same conductive ink used to form the heating pad, but they could alternatively be formed from silver tracks, or by stitching conductive wire (e.g. copper wire) into the fabric material. The rear of the garment also includes a back heating pad 11 of identical construction to heating pad 5, connected to the same battery via carbon tracks 13.

FIGS. 2A and 2B show a heatable wrist-band 101 formed from a flexible and stretchable fabric base material 103. The front of the wrist-band (shown in FIG. 2A), positioned over the anterior portion of a user's wrist in use, includes a heating pad 105, connected to a button-type battery on the rear of the wrist-band (shown in FIG. 2B) via conductive traces 107. The heating pad is formed in an identical fashion to the heating pads in the vest of FIGS. 1A and 1B, and overlaid with a silicone encapsulating layer in the same way.

FIGS. 3 to 7 provide close-up cross-sectional views of a woven fabric, showing different constructions of the heatable garment of the present invention in which a conductive ink is bonded directly to the fabric.

Figure 4:
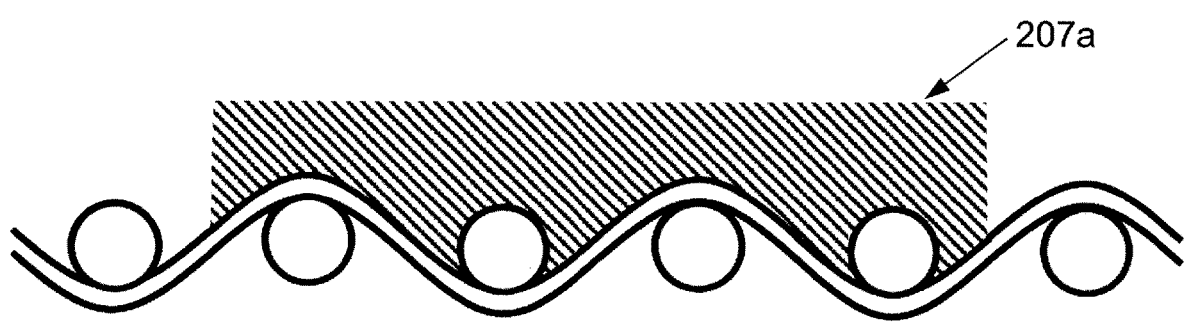
Figure 5:
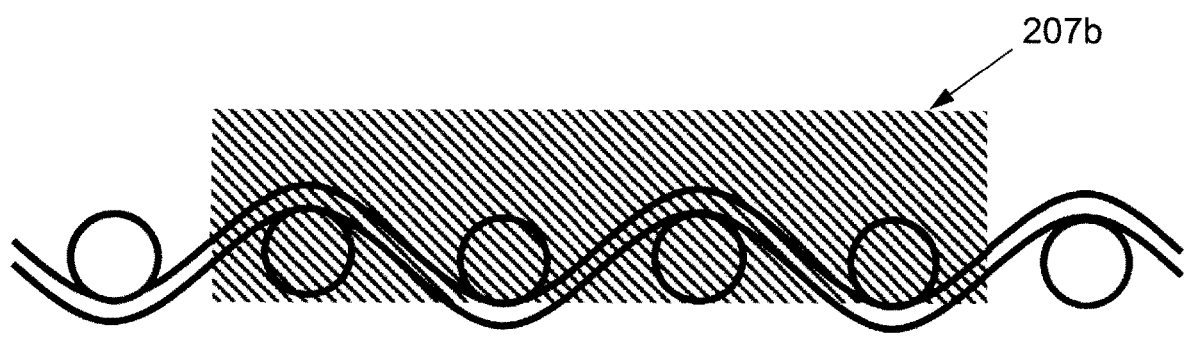
FIG. 5 is a cross-sectional view of a garment of the present invention showing a woven fabric over-printed with conductive ink which has permeated through the fabric and the individual yarns making up that fabric.
Figure 6:
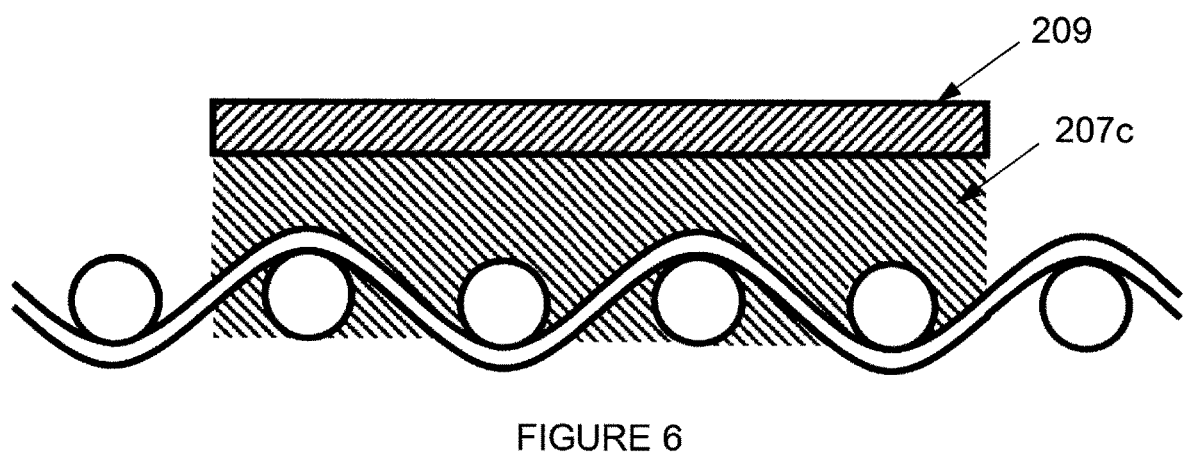
FIG. 6 is a cross-sectional view of a garment of the present invention showing a woven fabric over-printed with a two-layer heating pad which has permeated through the fabric, but not the individual yarns making up the fabric.
Figure 7:
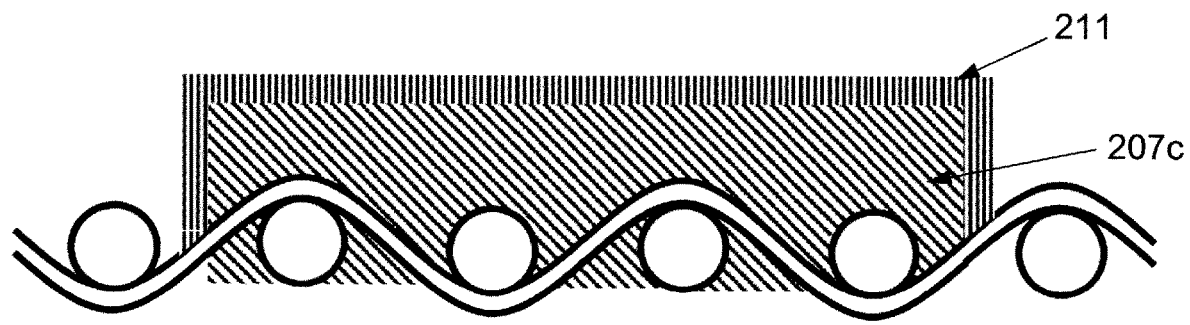
FIG. 7 is a cross-sectional view of a garment of the present invention having a heating pad encapsulated within an electrically-insulating silicone layer.

FIG. 3 shows a non-permeable fabric having warp yarns 203 and weft yarns 205, overcoated with a heating pad formed from a single layer of conductive ink 207. FIG. 4 shows the same construction as FIG. 3, but with a significantly thicker layer of conductive ink 207a. FIG. 5 shows a layer of conductive ink 207b coated onto a permeable fabric, where the conductive ink 207b has been allowed to soak through the fabric and into the individual yarns of the fabric before curing, creating a strong bond between the conductive ink 207b and the fabric. FIGS. 6 and 7 show further alternative construction, in which a layer of conductive ink 207c has been allowed to soak through the fabric before curing (but has not penetrated the individual yarns), and then coated with a second layer of conductive ink 209 (FIG. 6) or an encapsulating silicone layer 211 (FIG. 7).

Figure 8:
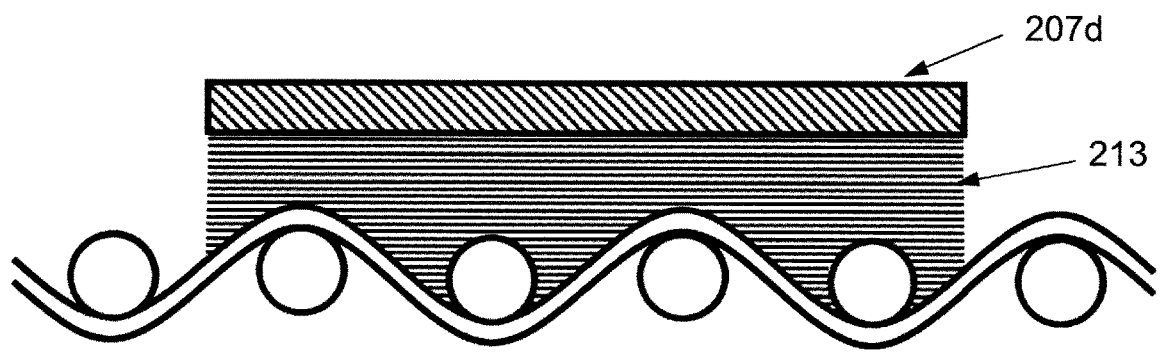
FIG. 8 is a cross-sectional view of a garment of the present invention having a heating pad printed onto an intermediate silicone layer.
Figure 9:
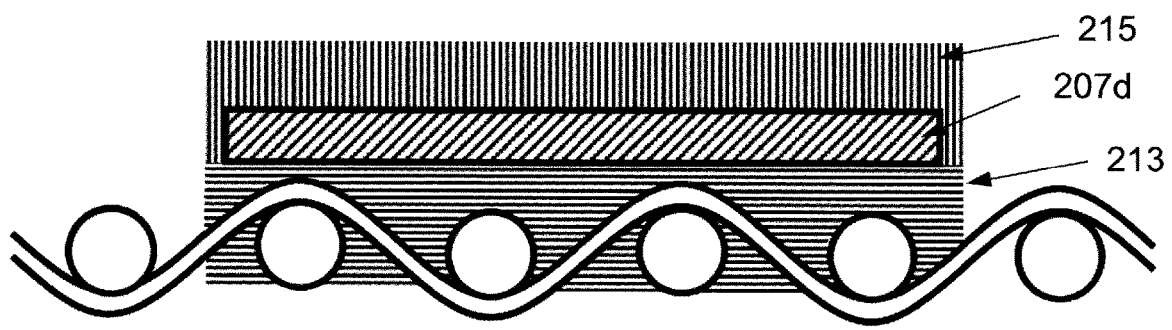
FIG. 9 is a cross-sectional view of a garment of the present invention having a heating pad encapsulated within a thermoplastic polyurethane layer.

FIG. 8 provides a close-up cross-sectional view of a woven fabric, in which a fabric has been covered with a layer of polymer 213 (an "intermediate" layer) before coating with a single layer of conductive ink 207d. In this case, the conductive layer 207d is indirectly bonded to the underlying fabric substrate. FIG. 9 shows a similar arrangement to FIG. 8 in which a first layer of polymer 213 (an intermediate layer) has been allowed to permeate into the fabric before coating with conductive ink 207d, followed by addition of a further layer of polymer 215 (an electrically-insulating covering layer). In this way, the conductive ink layer 207d is entirely encapsulated within the polymer. In this particular embodiment, the polymer 213 and polymer 215 are both thermoplastic polyurethane.

Experimental Results

EXAMPLE 1

In a first set of experiments, the viability of printing conductive ink directly onto fabric was evaluated.

A high percentage conductive ink containing carbon nanoparticles including functionalised graphene nanoplatelets (GNPs) (Haydale Graphene Industries plc) was bar coated onto a cotton textile to assess whether the ink would still be conductive when printed.

The textile was stretched and fixed into place using tape to minimise stretching during the printing process. A single layer of ink was applied, and the sample was subsequently removed and dried in an oven. Once dried a voltmeter was used to test the conductivity of the sample. The presence of a resistance proved that the ink was conductive. The sample was crumpled and then retested. It remained conductive.

These results showed that conductive carbon ink can be successfully printed onto a textile and can survive crumple testing and stretching.

EXAMPLE 2

In a second set of experiments, the effect of carbon loading on performance was assessed.

A "higher carbon content" heatable fabric was produced by bar coating cotton fabric swatches with a conductive ink containing carbon nanoparticles including functionalised GNPs (Haydale Graphene Industries plc). The ink was allowed to dry in an oven at 100° C., and then overprinted with a further ink layer. This process was repeated to produce a three-layered heating pad on a polyester/cotton blend fabric (67% polyester/33% cotton).

Next, the conductive ink was diluted with polyester thermoplastic polyurethane polymer to decrease the carbon content, and "lower carbon content" heatable fabric was produced using the same protocol as for the "high carbon content" fabric.

In both cases, the resulting samples were flexible fabrics that conducted electricity, having resistance values as follows:

TABLE 1

|  | Resistance (kΩ) |
| --- | --- |
| Example 2A (Higher carbon content ink) | 0.09 |
| Example 2B (Lower carbon content ink) | 77.2 |

This showed that the higher carbon content ink was significantly more conductive than the lower carbon content ink.

EXAMPLE 3

In a third set of experiments, the effect of the fabric substrate on the measured resistance value was assessed.

The protocol for making the "lower carbon content ink" sample of Example 2 was repeated using a cotton material, which was thinner than the polyester/cotton fabric, and has a lower denier fibre and lower thread count. The resulting sample displayed considerably higher resistance, as shown in Table 2:

TABLE 2

|  | Resistance (kΩ) |
|---|---|
| Example 2B (Thicker fabric) | 77.2 |
| Example 3A (Thinner cotton fabric) | 273.1 |

EXAMPLE 4

In a fourth set of experiments, the impact of the number of layers on resistance was evaluated.

A cotton substrate was ironed and secured to a surface before being screen-printed with the high carbon content ink using a 54-64 mesh. The resulting coated substrate was passed through an oven at 100° C. five times. This process was repeated to build up further layers where appropriate, with care taken to ensure registration between layers. The sheet resistance of the samples was then measured using a four-point probe.

Figure 10:
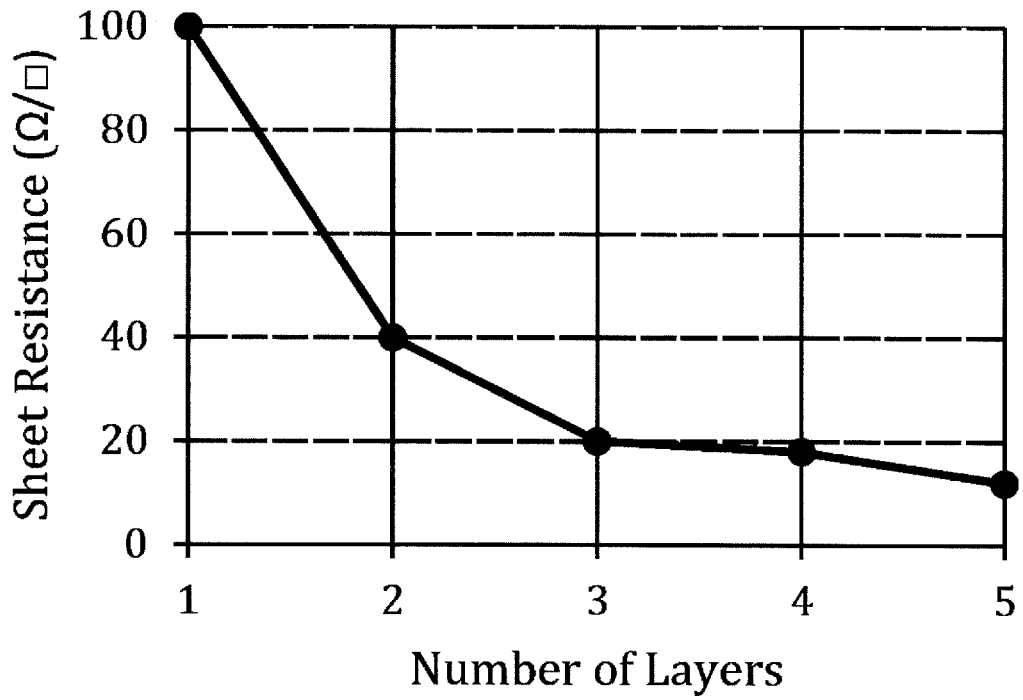
FIG. 10 is a plot showing the effect of increasing the number of layers of conductive ink on sheet resistance.

The results, shown in FIG. 10, demonstrate that the sheet resistance decreased as the number of layers increased, with the most significant drop in resistance being observed between one-layer and two-layer samples.

EXAMPLE 5

In a fifth set of experiments, the effect of providing silver tracks on the resistivity of the heating pad was assessed.

Figure 11:
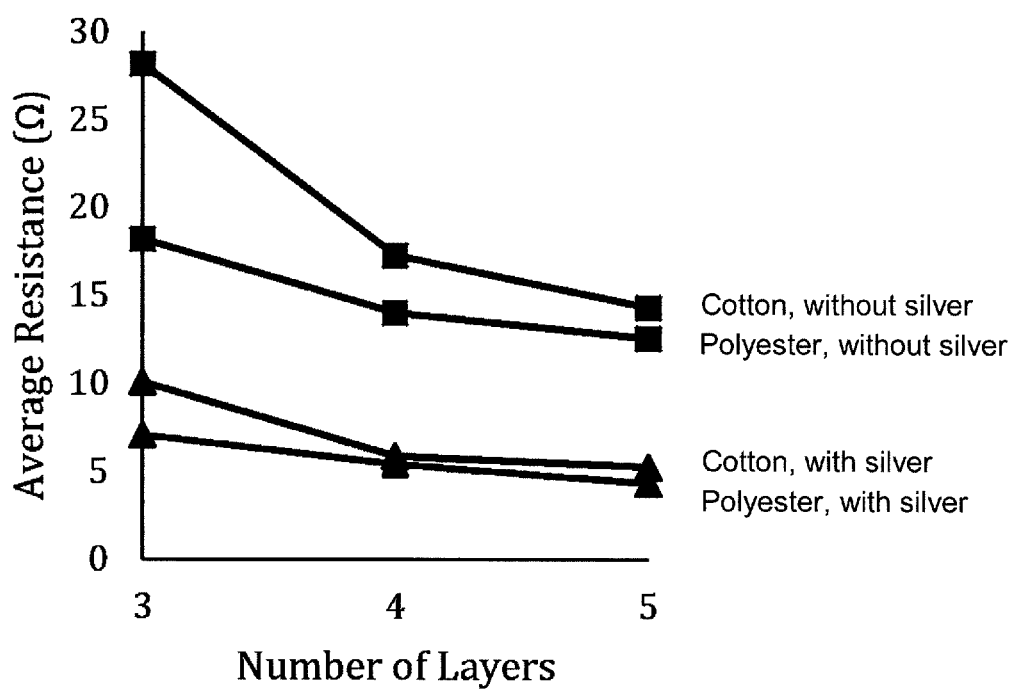
FIG. 11 is a plot showing the effects of adding silver contacts on the heating pads.

Heating pads were formed on polyester (100% polyester) substrates or polyester/cotton blend (66% polyester/33% cotton) substrates. The pads were made by screen-printing 3, 4 or 5 layers of conductive ink in the form of 5×5 cm blocks, with the samples passing through an oven five times at 100° C. after each layer was applied. To provide electrical contacts, silver tracks were applied to opposing ends of the square blocks by a stencil painting method. The resistance of the resulting heating pads is shown in FIG. 11.

This shows that the provision of the silver contacts reduced the resistivity of the samples by ~8Ω, due to the improved electron flow into the heating pads.

EXAMPLE 6

In a sixth set of experiments, the effect of providing an electrically-insulating covering was assessed.

Heating pads were formed on polyester, polyester/cotton blend (67% polyester, 33% cotton) or nylon substrates. The pads were made by applying multiple layers of conductive ink in the form of 5×5 cm blocks using either screen-printing or bar-coating, with the samples passing through an oven five times at 100° C. after each layer was applied. Silver tracks were applied to opposing ends of the square blocks by a stencil painting method, to provide electrical contacts with the heating pad. Finally, electrically insulating layers of silicone or polyurethane were applied over the heating pad and/or on the back face of the fabric, underlying the heating pad. The exact samples created are summarised in Table 3:

TABLE 3

| Example | Fabric | Number of conductive layers | Coating method* | Insulating layer overlaying heating pad | Insulating layer on opposite side of fabric to heating pad |
|---|---|---|---|---|---|
| 6A | Polyester | 3 | SP | Polyurethane | — |
| 6B | Polyester | 4 | SP | Silicone | — |
| 6C | Polyester | 4 | SP | — | Polyurethane |
| 6D | Polyester | 5 | SP | Silicone | — |
| 6E | Polyester/Cotton | 4 | SP | Silicone | Silicone |
| 6F | Nylon | 1 | BC | Silicone | — |

*SP = screen-printed, BC = bar-coated

Figure 12:
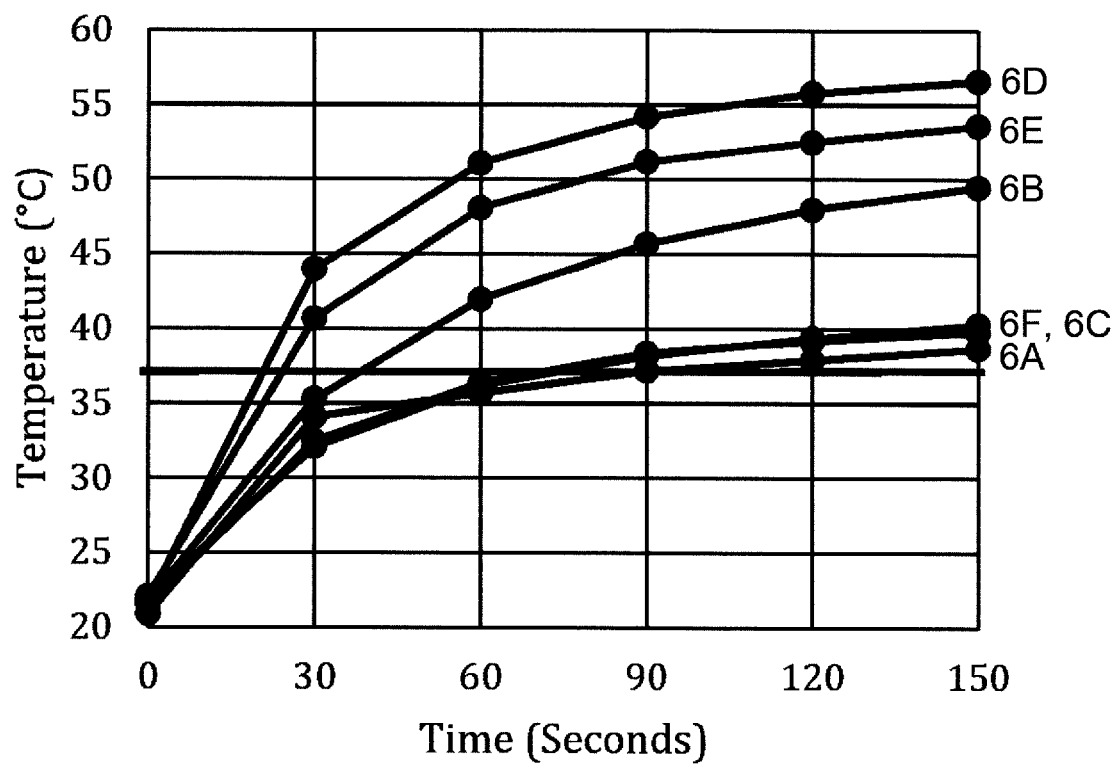
FIGS. 12 and 13 show the temperature achieved by heating pads on different fabrics both before (FIG. 12) and after (FIG. 13) being subjected to deformation.

The samples were then supplied with power from a 3V source via the silver contacts, and the temperature of the samples monitored using a thermal imaging camera. The peak temperature was measured every 30 seconds to assess the heating performance of the samples. The resulting resistance values are shown in FIG. 12.

The results show that all of the heaters reached temperatures of over 35° C. from a voltage of 3V within the first 30 seconds of power supply, and all eventually reached the target temperature of 37° C. (human body temperature—indicated by a straight line in FIG. 12) within 90 seconds. The rate of temperature increase means that the garments formed from the fabric would reach useful temperature relatively rapidly, but not so rapidly that the user would be unable to react if the heating pad became uncomfortably hot, thus decreasing the danger of burns occuring. The best performing heaters were all silicone encapsulated, and had ≥4 layers of ink. The images from the thermal imaging camera showed a relatively even temperature distribution across each heating pad.

Figure 13:
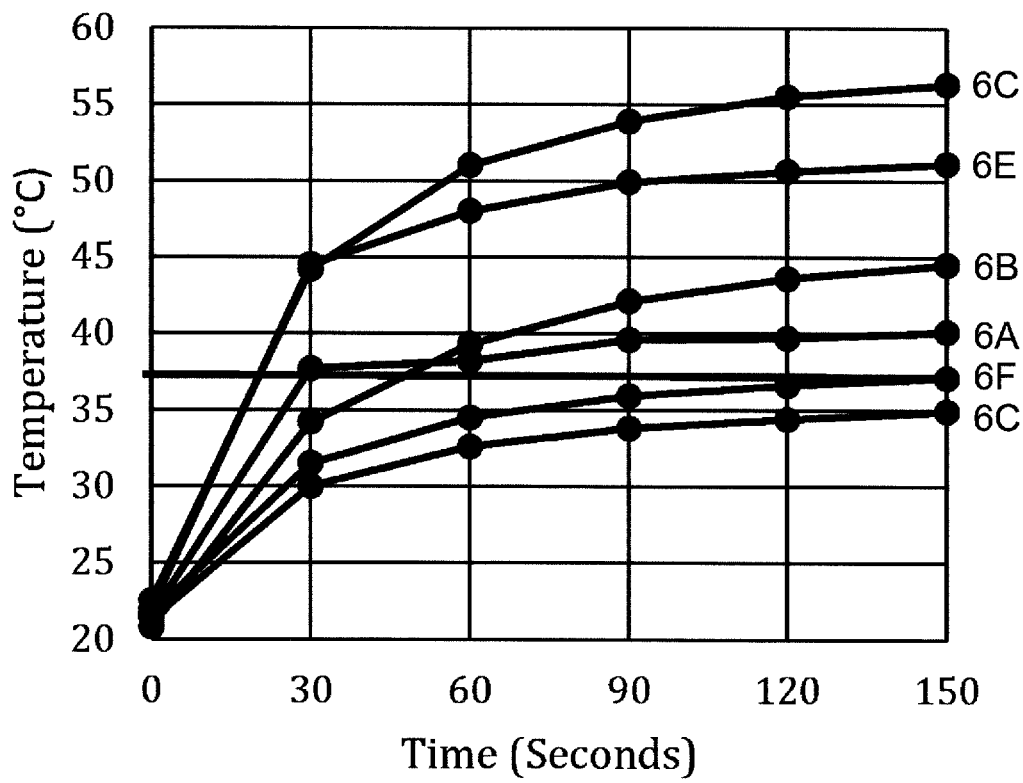

Next, the samples were subjected to deformation by bending them by hand across an 8 cm diameter circular bar 200 times, to simulate the kinds of strain a garment might be subjected to during use. The resistance values were then measured again, and compared with the pre-deformation values to assess the impact of deformation on the thermal performance. The resulting resistance values are shown in FIG. 13, and a comparison with the pre-deformation values is shown in Table 4:

TABLE 4

| Example | Resistance pre-deformation (Ω) | Resistance post-deformation (Ω) | Maximum temperature pre-deformation (° C.) | Maximum temperature post-deformation (° C.) | Temperature Difference [post-deformation − pre-deformation] (° C.) |
|---|---|---|---|---|---|
| 6A | 8.4 | 8.4 | 38.7 | 40.1 | 1.4 |
| 6B | 6.4 | 6.2 | 49.5 | 44.5 | −5 |
| 6C | 6.2 | 6.5 | 40.3 | 34.9 | −5.4 |
| 6D | 4.5 | 4.9 | 56.6 | 56.3 | −0.3 |

TABLE 4-continued

| Example | Resistance pre-deformation (Ω) | Resistance post-deformation (Ω) | Maximum temperature pre-deformation (° C.) | Maximum temperature post-deformation (° C.) | Temperature Difference [post-deformation − pre-deformation] (° C.) |
|---|---|---|---|---|---|
| 6E | 5.1 | 6 | 53.6 | 51.1 | −2.5 |
| 6F | 8 | 8 | 39.8 | 37.1 | −2.7 |

The deformation of the heaters resulted in a slight reduction in the maximum temperature achieved, except for Sample 6A which showed a slight increase in the temperature achieved. For silicone encapsulated samples, 6A, and 6D-6F, the deformation had little effect on the uniformity of the temperature profile across the heater, although slightly bigger drops in uniformity were observed for samples 6B-6C.

These results show that it is possible to print single or multi-layer heating pads onto fabric, and that such heating pads can achieve uniform temperatures around human body temperature upon application of modest voltages. The results also show that encapsulating the heating pad in an elastic material can improve thermal performance, and improve the robustness of the heating pad to deformation.

EXAMPLE 7

In a seventh set of experiments, the effect of using different printing techniques was assessed.

Fabrics (either 100% polyester, or 66% polyester/33% cotton blend) were printed with a conductive ink using a 5 cm×5 cm×100 µm stencil. The ink was deposited within the space in the stencil, excess ink was removed by drawing a block across the stencil, and then the ink was dried in an oven at 130° C. for 5 minutes to form a heating pad. The fabrics were printed whilst held in a stretched state using adhesive tape. The resulting cured ink blocks were then printed with silver lines along opposing sides of the block. The ink layers all displayed good uniformity, showed good flexibility and resistance to cracking when stretched.

Three different types of printing were carried out:
(i) Hand-Printing on Both Sides of the Fabric:
A first layer of conductive ink was applied to the fabric and allowed to dry at 130° C. for 5 minutes. The fabric was then turned over and printed with a second layer of conductive ink which directly overlay the first layer on the opposite side of the fabric.
(ii) Ink Soaking Technique
A thick layer of ink was deposited on the fabric within the stencil using a spatula, and allowed to soak into the fabric for 5 minutes before excess was removed, and the ink dried.
(iii) Solvent Soaking Technique:
The fabric was soaked with diacetone alcohol and printed with the conductive ink whilst still damp. This helped the conductive ink to soak into the fabric during printing, such that the conductive ink soaked all the way through the fabric.

TABLE 5

| Example | Fabric | Printing type |
|---|---|---|
| 7A | Polyester | Both sides |
| 7B | Polyester | Both sides |
| 7C | Polyester/Cotton | Both sides |

TABLE 5-continued

| Example | Fabric | Printing type |
|---|---|---|
| 7D | Polyester/Cotton | Both sides |
| 7E | Polyester | Ink soak |
| 7F | Polyester/Cotton | Ink soak |
| 7G | Polyester | Solvent soak |

Figure 14:
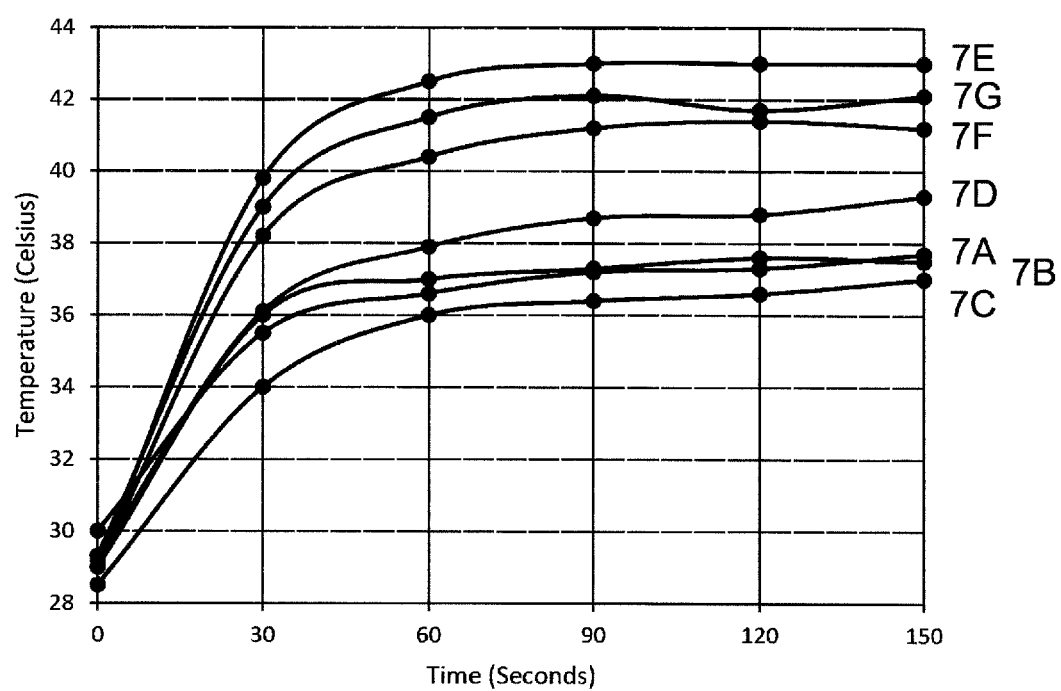
FIG. 14 shows the effects of using different printing techniques on the performance of the heating pads.

The heating pads were connected to a 3V power supply via the silver lines (in the case of the fabrics printed on both sides, only one layer of the conductive block was connected to the power source). The temperature of the heating pads during application of electrical power was monitored as in Example 6, resulting in the results shown in FIG. 14.

The results showed that all of the examples were capable of achieving temperatures above 35° C. from a 3V power source.

The results showed that the fabrics which had been soaked with either ink or solvent before printing heated more rapidly than those which had not been soaked, and attained higher temperatures. The fabrics which were printed on both the front and back did not appear to display any interaction between the layers on different sides of the surface.

These results show that soaking the fabric with either ink or solvent before printing resulted in improved performance, without an increase in the overall bulk of the fabric, and without adversely affecting mechanical properties.

In respect of numerical ranges disclosed in the present description it will of course be understood that in the normal way the technical criterion for the upper limit is different from the technical criterion for the lower limit, i.e. the upper and lower limits are intrinsically distinct proposals.

For the avoidance of doubt it is confirmed that in the general description above, in the usual way the proposal of general preferences and options in respect of different features of the heatable garments, fabrics and bedding and methods described above constitutes the proposal of general combinations of those general preferences and options for the different features, insofar as they are combinable and compatible and are put forward in the same context.

The terminology above used in relation to garments and bedding is based on normal U.K. English usage, and the skilled reader will understand that certain of the above items may be given different names in other English-speaking countries, such as the U.S.A.

The invention claimed is:
1. A heatable garment, comprising a garment body and a heating pad, an intermediate layer, and an electronically-insulating covering layer, wherein the heating pad comprises graphene particles dispersed in a polymer matrix material, wherein:
the intermediate layer is adhered to the garment body;
the heating pad is adhered to the intermediate layer;
the electrically-insulating covering layer overlays and is bonded to the heating pad, the intermediate layer and electrically-insulating covering layer are made from polyurethane or silicone; and wherein the graphene particles are functionalized graphene particles selected from amine-functionalized, amide-functionalized or halogen functionalized graphene particles.

2. A heatable garment according claim 1, wherein the graphene particles are graphene nanoplatelets.

3. A heatable garment according to claim 2, wherein the graphene nanoplatelets have an average of 2 to 100 graphene layers per particle.

4. A heatable garment according to claim 2, wherein the graphene nanoplatelets have an average of 2 to 5 graphene layers per particle.

5. A heatable garment according to claim 1, wherein the heating pad comprises multiple stacked layers of conductive material.

6. A heatable garment according to claim 1, wherein the average thickness of the heating pad is 300 µm or less.

7. A heatable garment according to claim 1, wherein the polymer matrix material is an elastic material.

8. A heatable garment according to claim 1, wherein the heating pad is adhered directly to the garment body.

9. A heatable garment according to claim 1, wherein the heating pad is indirectly adhered to the garment body, with the heating pad adhered to an intermediate layer which is itself adhered to the garment body.

10. A heatable garment according to claim 9, wherein the intermediate layer is made from polyurethane.

11. A heatable garment according to claim 1, comprising a temperature control system, to control the temperature of the heating pad.

12. A heatable garment according to claim 11, wherein the heatable garment comprises two or more of said heating pads, and the control system is configured to allow independent control over the temperature of each heating pad.

13. A heatable garment according to claim 12, comprising two or more of said heating pads which target different muscle groups, wherein the control system is configured to allow the temperature of the heating pads to be independently adjusted according to the muscle group.

14. A heatable garment according to claim 1, wherein the garment is a pair of trousers or shorts.

15. A heatable garment according to claim 1, wherein the garment is a top.

16. A heatable garment according to claim 1, wherein the garment is a strap.

17. A method of making a heatable garment according to claim 1, comprising:
providing said clothing material;
depositing an electrically-insulating layer onto at least a portion of the clothing material;
depositing one or more layers of said conductive material onto the electrically-insulating layer; and
depositing an electrically-insulating covering layer onto said one or more layers of conductive material;
wherein the conductive material comprises graphene particles dispersed in a polymer matrix material.

18. A heatable fabric, comprising a heating pad adhered to at least a portion of a fabric substrate, an intermediate layer, and an electronically-insulating covering layer, wherein the heating pad comprises graphene particles dispersed in a polymer matrix material, wherein:
the intermediate layer is adhered to the fabric substrate;
the heating pad is adhered to the intermediate layer;
the electrically-insulating covering layer overlays and is bonded to the heating pad,
the intermediate layer and electrically-insulating covering layer being made from polyurethane or silicone; and
wherein the graphene particles are functionalized graphene particles selected from amine-functionalized, amide-functionalized or halogen functionalized graphene particles.

19. A heatable bedding material, comprising a bedding material body and a heating pad adhered to at least a portion of the bedding material body, wherein the heating pad comprises graphene particles dispersed in a polymer matrix material, wherein:
the intermediate layer is adhered to the bedding material;
the heating pad is adhered to the intermediate layer;
the electrically-insulating covering layer overlays and is bonded to the heating pad,
the intermediate layer and electrically-insulating covering layer being made from polyurethane or silicone; and
wherein the graphene particles are functionalized graphene particles selected from amine-functionalized, amide-functionalized or halogen functionalized graphene particles.

* * * * *

UNITED STATES PATENT AND TRADEMARK OFFICE
CERTIFICATE OF CORRECTION

| | |
|---|---|
| PATENT NO. | : 11,122,840 B2 |
| APPLICATION NO. | : 16/071802 |
| DATED | : September 21, 2021 |
| INVENTOR(S) | : Davide Deganello, Youmna Mouhamad and Andrew Claypole |

It is certified that error appears in the above-identified patent and that said Letters Patent is hereby corrected as shown below:

On the Title Page

Item (12) delete "DeGanello et al." and insert --Deganello et al.--

Item (72) Inventors, delete "DeGanello" and replace with "Deganello"

Signed and Sealed this
Twenty-first Day of May, 2024

Katherine Kelly Vidal
*Director of the United States Patent and Trademark Office*